United States Patent

Drolen et al.

[11] Patent Number: 5,735,489
[45] Date of Patent: Apr. 7, 1998

[54] HEAT TRANSPORT SYSTEM FOR SPACECRAFT INTEGRATION

[75] Inventors: Bruce L. Drolen, Pasadena; David B. Esposto, Redondo Beach; George L. Fleischman, Cerritos; Calvin H. Ito, West Hills, all of Calif.

[73] Assignee: Hughes Electronics, Los Angeles, Calif.

[21] Appl. No.: 577,434

[22] Filed: Dec. 22, 1995

[51] Int. Cl.$^6$ .................................................. B64G 1/50
[52] U.S. Cl. ...................... 244/163; 244/158 R
[58] Field of Search ...................... 244/163, 158 R; 165/41, 106.14, 171

[56] References Cited

U.S. PATENT DOCUMENTS

| | | |
|---|---|---|
| 3,749,156 | 7/1973 | Fletcher et al. . |
| 3,931,532 | 1/1976 | Byrd ............................................. 310/4 |
| 4,324,375 | 4/1982 | O'Neill ........................................ 244/163 |
| 4,880,050 | 11/1989 | Nakamura et al. . |
| 5,027,892 | 7/1991 | Bannon et al. . |
| 5,036,905 | 8/1991 | Eninger et al. ............................. 165/41 |
| 5,344,104 | 9/1994 | Homer et al. . |

OTHER PUBLICATIONS

European Search Report, Application No. EP 96 12 0402, dated Apr. 4, 1997.

*Primary Examiner*—Andres Kashnikow
*Assistant Examiner*—Tien Dinh
*Attorney, Agent, or Firm*—Terje Gudmestad; Elizabeth E. Leitereg; W. K. Denson-Low

[57] ABSTRACT

The present invention relates to an apparatus for transferring heat in a spacecraft. The apparatus includes a flexible heat pipe having a first section, a second section, and a flexible section. A first member of a spacecraft is coupled to the first section of the flexible heat pipe, and a second member of the spacecraft is coupled to the second section of the flexible heat pipe. The first member of the spacecraft is in a rigidly fixed relationship to the second member of the spacecraft. A method of using a heat transport system for transferring heat in a spacecraft is also provided. The method includes providing a flexible heat pipe having a first section, a second section, and a flexible section, coupling the first section of the flexible heat pipe to a first member of a spacecraft, and coupling the second section of the flexible heat pipe to a second member of the spacecraft rigidly fixed with respect to the first member.

21 Claims, 2 Drawing Sheets

HEAT TRANSPORT SYSTEM FOR SPACECRAFT INTEGRATION

BACKGROUND OF THE INVENTION

The present invention generally relates to transferring heat in a spacecraft, and more particularly to a heat transport system for spacecraft.

Man has entered a period where spacecraft communication has become an important part of today's society, and there has been a growing demand to increase the capabilities of spacecraft that orbit the earth. As a result, more equipment, such as electronic devices, are carried on-board the spacecraft. Because of the increase in the amount of equipment used in the spacecraft, dissipating the heat generated from the equipment has become an increasing concern.

Traditional spacecraft are generally designed with a majority of the equipment mounted directly on the surfaces of the radiator panels that form the side of the outer structure of the spacecraft. This particular arrangement allows the equipment to cool via direct radiation to space. Because the equipment is usually located on the radiator of the spacecraft, signals from the equipment may be reduced or degraded as they travel to other components in other portions of the spacecraft. For example, RF signals that are received by the antenna feeds, located near the center of the satellite, may be reduced when transferred to the communication modules located on the exterior of the radiator panels. Further, the amount of equipment that can be mounted to the radiators is limited by the size and number of radiators. Because the radiators can only be as large as the dimensions of the side of the spacecraft or launcher, the area that is available for mounting the equipment on the radiators usually cannot accommodate the amount of equipment needed for modern spacecraft.

Spacecraft have also been developed where the equipment is mounted to shelves within the spacecraft. The heat from the equipment is usually transferred through conventional heat pipes to the radiator for dissipation to space. However, it may be difficult and time consuming to install the heat pipes in the spacecraft. In securing the heat pipes to the radiator and shelves, a fastener is positioned through holes of the heat pipe and into the corresponding holes of the radiator and shelves. Because the holes of the heat pipe have to be properly aligned with the holes of the shelf and radiator, many misalignments may occur during the assembly of the spacecraft. As a result, the holes of the heat pipe may have to be enlarged in order to secure the heat pipe to the shelves and radiator which may compromise its thermal interface and reduce the amount of heat transferred. These problems are magnified when one considers that typical spacecraft have numerous heat pipes. Furthermore, conventional heat pipes that have high tolerance requirements are expensive to manufacture and time consuming to install.

There is, therefore, a need for a heat transport system that allows for easier integration of the heat pipes in spacecraft. It would be desirable to provide a device that would simplify manufacturing, reduce labor costs and manufacturing time, facilitate rapid production, minimize the need for custom design, and improve the reliability of the thermal joints between the heat pipes.

SUMMARY OF THE INVENTION

The present invention achieves the above benefits by providing an improved heat transport system. The present invention allows equipment in a spacecraft to be remotely positioned from the radiator and allows for the transfer of heat from the equipment to the radiator. The present invention also facilitates manufacturing of the spacecraft by alleviating assembly misalignments when securing heat pipes to the shelf and radiator. The present invention preferably reduces design time, decreases production time, and allows for greater use of pre-built production components for spacecraft assembly.

In one aspect of the invention, the apparatus includes a flexible heat pipe having a first section, a second section, and a flexible section. A first member of a spacecraft is coupled to the first section of the flexible heat pipe, and a second member of a spacecraft is coupled to the second section of the flexible heat pipe. The first member of the spacecraft is preferably in a rigidly fixed relationship to the second member of the spacecraft.

In another aspect of the invention, a method of using a heat transport system for transferring heat is provided. The method includes the steps of providing a flexible heat pipe having a first section, a second section, and a flexible section, coupling the first section of the flexible heat pipe to a first member of the spacecraft, coupling the second section of the flexible heat pipe to a second member of the spacecraft preferably rigidly fixed with respect to the first member.

Another aspect of the invention relates to a satellite having a radiator, at least one electronic device, and a heat transfer device. The heat transfer device includes a flexible heat pipe having a first section, a second section, and a flexible section. The heat transfer device is coupled to a first member and a second member of the satellite that are rigidly fixed with respect to each other.

These and other features and advantages of the invention will become apparent upon a review of the following detailed description of the presently preferred embodiments of the invention, taken in conjunction with the appended drawings.

DETAILED DESCRIPTION OF THE PREFERRED EMBODIMENTS

Figure 1:
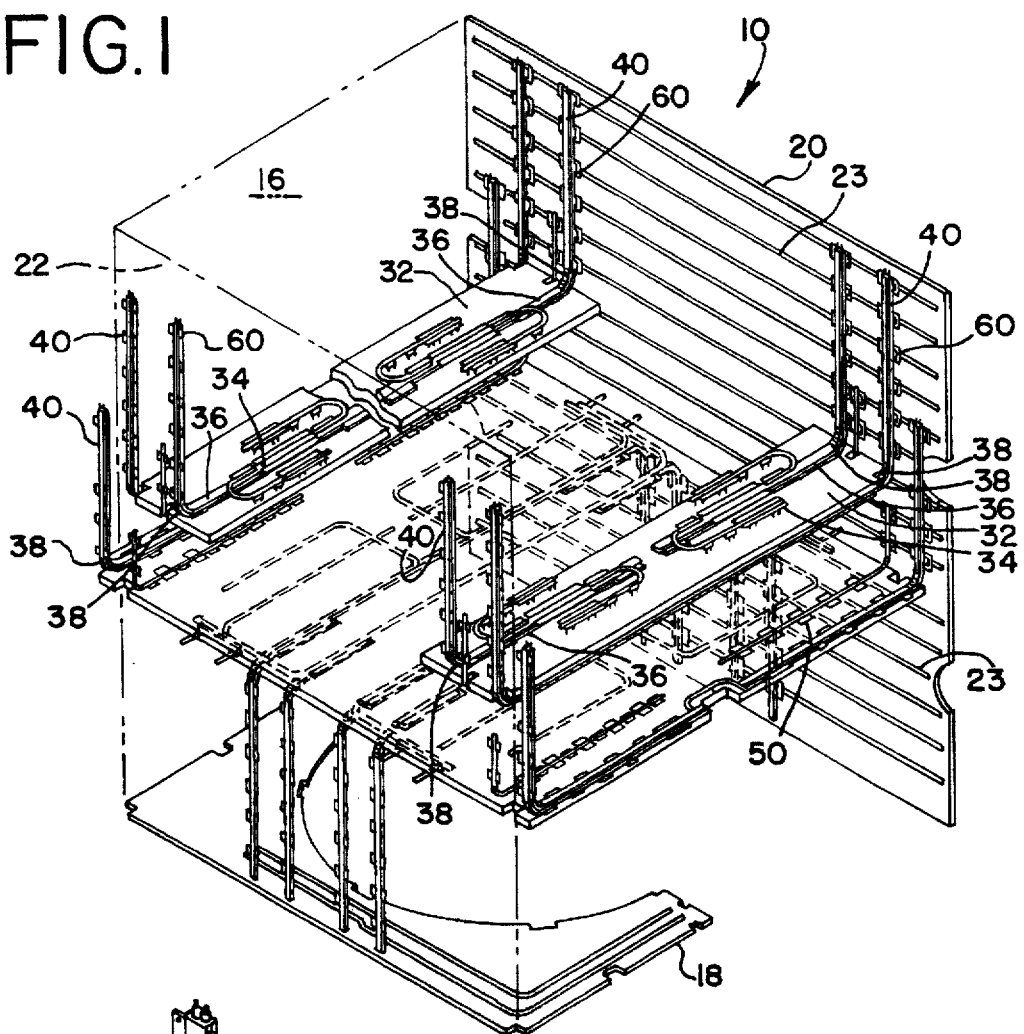
FIG. 1 is a perspective view of a module holding compartment, with parts removed for ease of illustration, capable of utilizing the heat transport system of the present invention.

Referring now to the drawings in detail, and more particularly to FIG. 1, a preferred embodiment of the invention is illustrated with parts removed. A module holding compartment 10 of a spacecraft is shown. The compartment 10 includes a back wall 16, a base 18, a pair of radiators 20, 22 (shown in phantom), and a plug-in module 32. The radiators 20, 22 are spaced apart and substantially parallel to each other. The back wall 16 of the compartment 10 extends between the radiators 20, 22. The plug-in module 32, such as a shelf, is disposed within the compartment 10. The module 32 preferably has a plurality of electrical devices 34 disposed thereon.

Figure 2:
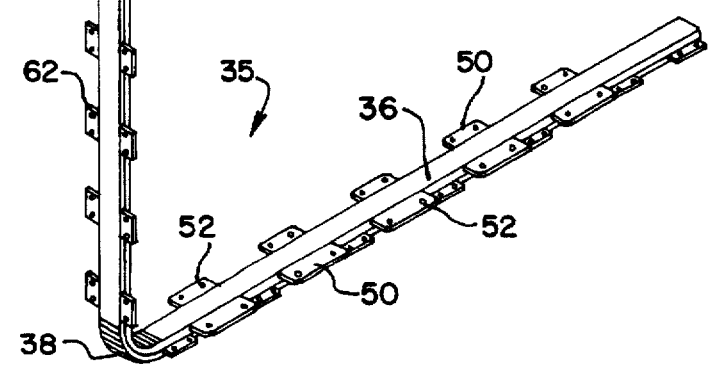
FIG. 2 is a perspective view of a preferred embodiment of a flexible heat pipe according to the present invention.

Referring to FIG. 2, a preferred embodiment of a flexible heat pipe 35 is shown. The flexible heat pipe 35 is commonly available from many sources such as Swales, Inc. and has a capillary structure (not shown) disposed therein. The flexible heat pipe 35 also contains a heat transfer fluid (not shown), such as ammonia.

The flexible heat pipe 35 includes a first section 36, a second section 40, and a flexible section 38. The first section 36 of the flexible heat pipe 35 is mounted to a first member of the spacecraft as shown in FIG. 1. Preferably, the first member is the plug-in module 32. The flexible heat pipe 35 has a plurality of flanges 50 extending from the first section 36. The flanges 50 preferably have a plurality of holes 52. In order to attach the first section 36 to the plug-in module 32, the holes of first section 36 are aligned with corresponding holes in the plug-in module 32. A fastener 54 is disposed through the holes of the plug-in module 32 and the flanges 50 to secure the first section 36 to the plug-in module 32. As those skilled in the art will recognize, the first section 36 of the flexible heat pipe 35 may be embedded into the plug-in module 32 without departing from the spirit and scope of the present invention.

Figure 3:
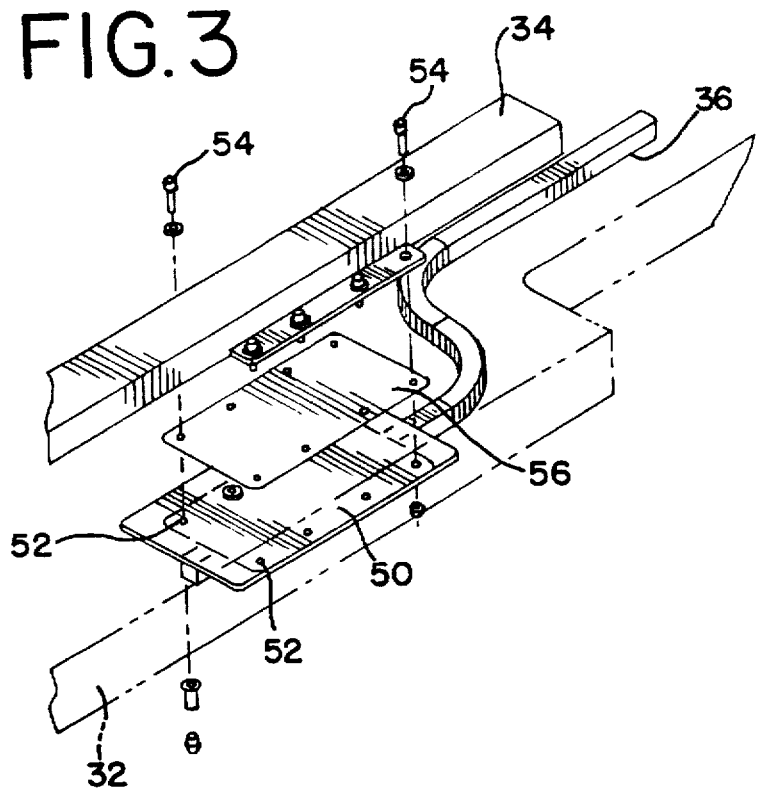
FIG. 3 is a perspective view of a preferred embodiment of the first section of the flexible heat pipe according to the present invention.

The first section 36 of the flexible heat pipe 35 is also in thermal communication with a first component 34, such as an electrical device, heat pipe, or other equipment. A piece of conductive material 56 is preferably disposed between the flanges 50 and the first member 34 to improve the thermal contact between them. (See FIG. 3) Preferably, the material comprises grafoil.

Figure 4:
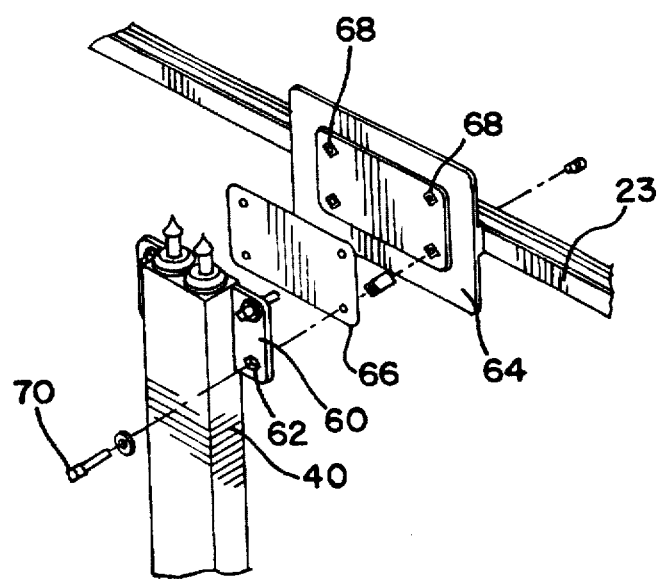
FIG. 4 is a perspective view of a preferred embodiment of the second section of the flexible heat pipe according to the present invention.

As shown in FIG. 2, the flexible heat pipe 35 has flanges 60 extending from the second section 40. The second section 40 of the flexible heat pipe 35 is mounted to a second member of the spacecraft. Preferably, the second member comprises a heat pipe 23 attached to a radiator 22 as shown in FIGS. 1 and 4. It is contemplated that the second member may comprise a shelf, a radiator, or the like.

The second member has a platform 64 attached thereto, and the platform 64 has a plurality of holes 68 therethrough. The flanges 60 of the second section 40 also preferably include a plurality of holes 62 that align with the corresponding holes 68 in the platform 64 in order for the second section 40 to be secured thereto. A fastener 70 is disposed through the holes of the flanges 60 and the platform 64 to secure the second section 80 to the second member.

The second section 40 of the heat pipe 35 is also preferably in thermal communication with the platform 64. A piece of material 66 is preferably disposed between the flanges 60 of the second section 40 and the platform 64 to improve thermal contact. Preferably, the material comprises grafoil.

As seen in FIG. 2, the flexible section 38 of the flexible heat pipe 35, such as a bellows, is preferably bendable in order to accommodate for manufacture variations when securing or mounting the flexible heat pipe 35 to the first and second members. The flexible section 38 is preferably manufactured from a corrugated metal product, such as stainless steel or aluminum.

As those skilled in the art will recognize, the heat transport system may be used in many other applications without departing from the spirit and scope of the present invention. For example, the heat transport system may be used in conjunction with capillary-pumped loops (CPL) or loop heat pipes (LHP).

According to the invention, the heat transport system allows heat from internal equipment to be transported to the radiator of the spacecraft. The system provides a cost effective system that allows for greater use of pre-built production hardware. The system also facilitates manufacturing of the spacecraft by alleviating assembly misalignments when securing heat pipes to the shelf and radiator.

Although the present invention has been described in detail by way of illustration and example, various changes and modifications may be made without departing in any way from the spirit of the invention and scope of the appended claims.

We claim:

1. An apparatus for transferring heat in a spacecraft, comprising:
    a flexible heat pipe having a first section, a second section, and a flexible section;
    a first member of the spacecraft coupled to the first section of the flexible heat pipe;
    a second member of the spacecraft coupled to the second section of the heat pipe; and
    the first member of the spacecraft being in a permanently rigidly fixed relationship to the second member of the spacecraft.

2. The apparatus of claim 1 wherein the first member comprises a plug-in module.

3. The apparatus of claim 1 wherein the first member comprises a shelf.

4. The apparatus of claim 1 wherein the first member comprises a heat pipe.

5. The apparatus of claim 1 further comprising electronic component in thermal communication with the first section of the flexible heat pipe.

6. The apparatus of claim 1 wherein the second member comprises a heat pipe.

7. The apparatus of claim 6 wherein the second member comprises a radiator.

8. The apparatus of claim 1 wherein the second member is in thermal communication with a radiator.

9. The apparatus of claim 1 wherein the flexible section comprises a corrugated metal.

10. The apparatus of claim 1 wherein the flexible heat pipe has a heat transfer medium disposed therein.

11. A method of using a flexible heat pipe for transferring heat in a spacecraft comprising the steps of:
    providing a flexible heat pipe having a first section, a second section, and a flexible section;
    coupling the first section of the flexible heat pipe to a first member of the spacecraft;
    coupling the second section of the flexible heat pipe to a second member of the spacecraft permanently rigidly fixed with respect to the first member.

12. The method of claim 11 further comprising the step of coupling the first section of the flexible heat pipe to an electrical component.

13. The method of claim 11 wherein the first member comprises a plug-in module.

14. The method of claim 11 wherein the first member comprises a shelf.

15. The method of claim 11 wherein the second member comprises a heat pipe.

16. The method of claim 12 wherein the second member comprises a radiator.

17. The method of claim 11 further comprising the step of communicating heat from the second member to a radiator.

18. A satellite comprising:
    a radiator;
    at least one electronic device;
    a heat transfer device including a flexible heat pipe having a first section, a second section, and a flexible section, the heat transfer device coupled to a first member and a second member of the satellite; and the first member and second member permanently rigidly fixed with respect to each other.

19. The apparatus of claim 18 wherein the first member comprises a plug-in module.

20. The apparatus of claim 18 wherein the first member comprises a shelf.

21. The apparatus of claim 18 wherein the second member comprises a heat pipe.

* * * * *